United States Patent [19]
Roberts et al.

[11] 3,851,435
[45] Dec. 3, 1974

[54] FASTENING MEANS FOR JOINING MEMBERS

[75] Inventors: H. Evan Roberts, St. Louis; Alan E. Gickler, Warrenton, both of Mo.

[73] Assignee: The Binkley Company, Warrenton, Mo.

[22] Filed: Jan. 8, 1973

[21] Appl. No.: 322,016

[52] U.S. Cl. ............... 52/754, 52/753 T, 52/758 R, 211/177
[51] Int. Cl. .............................................. F16b 5/06
[58] Field of Search ...... 52/285, 754, 753 T, 753 C, 52/758 R, 760; 211/148, 177, 183; 7/14.5

[56] References Cited
UNITED STATES PATENTS

| | | | |
|---|---|---|---|
| 2,101,001 | 11/1937 | Balduf | 52/285 X |
| 2,879,561 | 3/1959 | Rieder | 211/148 X |
| 2,902,166 | 9/1959 | Bahr | 211/177 X |
| 3,112,034 | 11/1963 | Kaufman et al. | 211/148 |
| 3,217,894 | 11/1965 | Shewell | 211/177 |
| 3,244,290 | 4/1966 | Kaufman et al. | 211/148 |
| 3,265,456 | 8/1966 | Woolever | 211/148 |
| 3,545,712 | 12/1970 | Ellis | 52/754 X |
| 3,618,993 | 11/1971 | Platte | 52/754 |

FOREIGN PATENTS OR APPLICATIONS

| | | | |
|---|---|---|---|
| 293,573 | 4/1965 | Netherlands | 211/177 |

Primary Examiner—Werner H. Schroeder
Attorney, Agent, or Firm—Rogers, Ezell & Eilers

[57] ABSTRACT

This invention relates to a fastener for joining members together, the fastener comprising a tongue means formed in a first member to be joined and a groove means formed in a second member to be joined, said groove means having a spanning member which extends at least part way over the side of the tongue means with the tongue means inserted into the groove means. Also provided are means for locking the tongue means in the groove means once it is inserted, and means for urging the tongue means into locking engagement within the groove means.

9 Claims, 7 Drawing Figures

PATENTED DEC 3 1974　　　　　　　　　　　　　　　　3,851,435

FASTENING MEANS FOR JOINING MEMBERS

SUMMARY OF THE INVENTION

This invention relates to a fastening means and particularly to one that is self-locking once joined to provide a very secure and rigid structure without the need for welding, screwing, bolting or the like.

This invention has particular application in the field of modular, mobile, and even conventional homes where it is critical to minimize cost of assembly such as in the framing structure of the floor, ceiling, and walls, although the invention is also applicable wherever it is desired to join members, such as framing members, both quickly and securely to form a strong supporting structure.

Heretofore it has been customary to use metal framing members of light gauge sheet metal joined such as by welding, screwing, or bolting to form the supportive framing structure for modular homes and the like. Any of these conventional joining techniques require some means for aligning the members such as jigs or fixtures for assembly. These methods of joining have proven to be time consuming and relatively expensive, particularly due to the high labor costs involved. Furthermore, zinc coated steel is often used in these applications, and the fumes generated from the welding of zinc are quite hazardous to health. In contrast, this invention provides a means for fastening the frame members both quickly and securely without the need for tools, welding skill, jigs or fixtures, and without generating hazardous fumes, and such that the members, once joined, are permanently locked together to form an extremely strong and rigid structure.

While various types of tongue and groove joints are known in the art, none are believed to produce a self-locking joint of the strength and rigidity of this invention. In these respects, this invention represents a significant departure over the prior art.

Generally, the fastening means of this invention comprises a first member having a tongue means formed therein, and a second member to be joined to the first member having a groove means adaptable to receive the tongue means. The groove is formed with a lower spanning member over which the tongue lies after being joined in place. The tongue is provided with a protrusion extending from its side adjacent the spanning member and located near the end of the tongue, which protrusion is designed to intercept the spanning member when the tongue is inserted into the groove to lock the tongue in place. The spanning member is sloped upwardly toward its rear edge, and a small protrusion is formed on the second member a short distance from the rear edge of the spanning member so as to urge the tongue downwardly against the spanning member as it is pushed into the groove to insure a firm engagement of the spanning member by the tongue protrusion to effectively lock the tongue in the groove. Once the tongue is inserted in the groove such that the protrusion passes the spanning member, the tongue snaps firmly against the spanning member and is permanently locked in place. The tongue is tapered to further insure a tight fit within the groove.

To join the members with this invention, it is only necessary to insert the tongue through the groove until the tongue snaps in place. The result is a self-locking means for securely fastening the members together. The joint is so secure, that once assembled, it cannot be disassembled without substantial damage to the members.

Hence, it is a primary object of this invention to provide a means for fastening two members together with a joint that is self-locking and exceptionally strong.

This and other objects of the invention will become evident from the drawings and detailed description to follow.

DETAILED DESCRIPTION OF A PREFERRED EMBODIMENT

Figure 1:
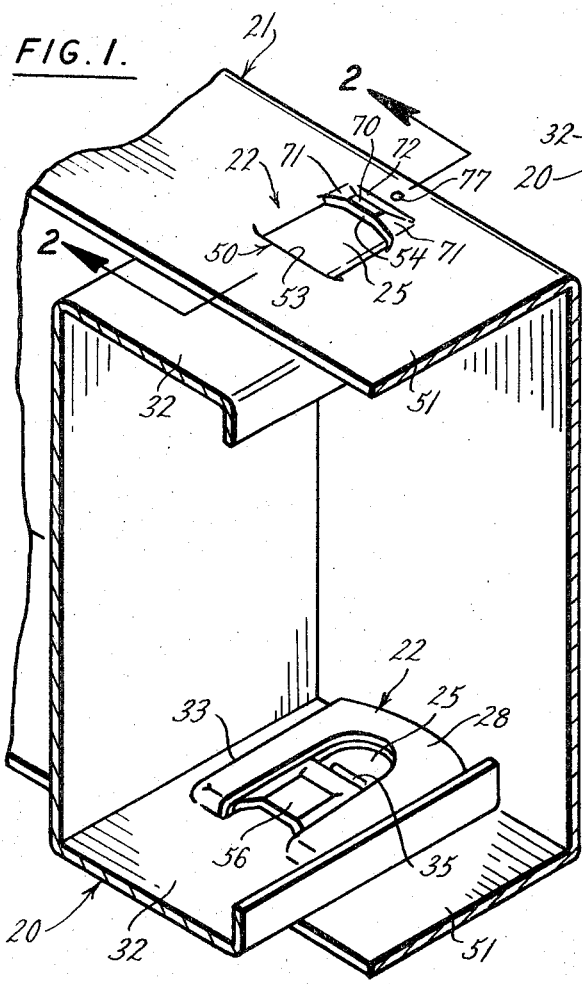
FIG. 1 is a fragmentary isometric view of two framing members joined together with a fastening means of this invention.
Figure 5:
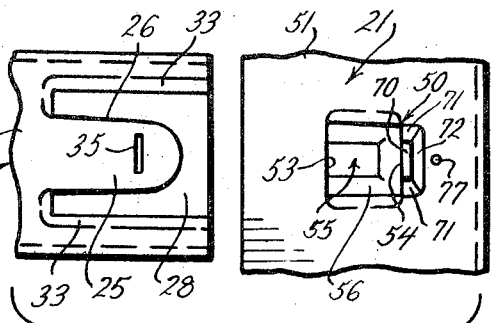
FIG. 5 is a plan view of the upper fastening means of FIG. 1 before the members are joined.
Figure 6:
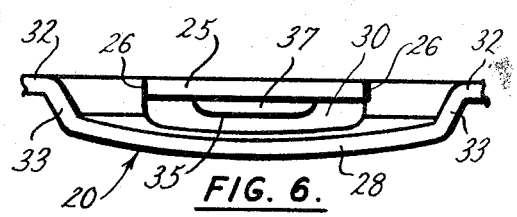
FIG. 6 is an enlarged right end elevation view of the tongue portion (left portion) of the fastener of FIG. 5.

In the drawing there is shown a first frame member 20 and a second frame member 21 joined together with a fastener 22 of this invention. The frame members 20 and 21, for example, might be a cross member and perimeter member, respectively, of a floor frame for a modular home or the like. The numbers 20 and 21 are, for example, of light gauge zinc coated steel, although they could be made of other metals, or materials such as plastic. A tongue 25 is formed in the member 20 near its end. This is accomplished by shearing the member 20 along a generally U-shaped line 26, as best shown in FIG. 5, and depressing a portion 28 of the member 20 surrounding the tongue 25 downwardly as best shown in FIG. 6, thereby leaving a space 30 between the tongue 25 and the portion 28. The portion 28 is joined to the surface 32 of the member 20 by outwardly sloping walls 33.

Near, but spaced from, the forward end of the tongue 25 is a short protrusion 35 extending downwardly therefrom as viewed in FIG. 6, the protrusion having a rearwardly sloping leading surface 36 (FIG. 2) to make it easy to insert the tongue into the groove as will be described, and a trailing, generally vertical, surface 37 to act as a means for locking the tongue in place once inserted as will be described.

Figure 7:
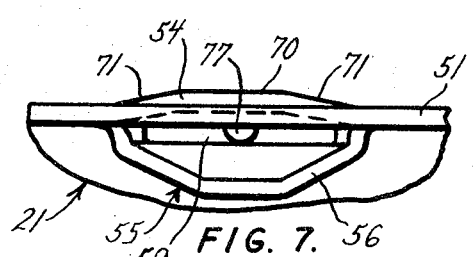
FIG. 7 is an enlarged left end elevational view of the groove portion (right portion) of the fastener of FIG. 5.

A groove 50 is formed in a selected wall such as the wall 51 of the member 21 to receive the tongue 25. The groove 50 is formed by shearing the wall 51 along the lines 53 and 54 and bending a portion 55 between the lines 53 and 54 downwardly to form a spanning member 56, which is shaped generally as shown in FIG. 7. The spanning member 56 defines with the surrounding wall 51 a groove 59 into which the tongue 25 is inserted.

Figure 2:
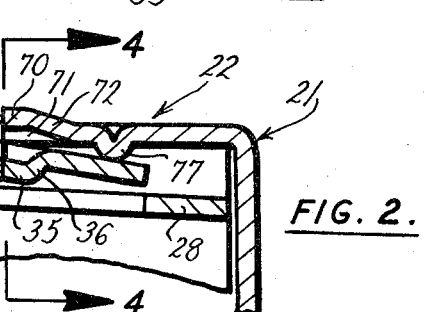
FIG. 2 is an enlarged view in section taken generally along the line 2—2 of FIG. 1.
Figure 3:
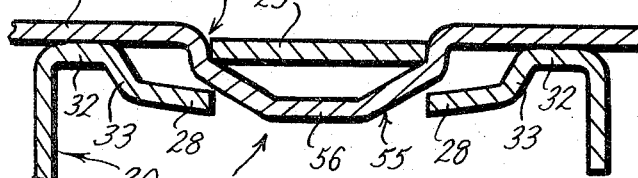
FIG. 3 is a view in section taken generally along the line 3—3 of FIG. 2.
Figure 4:
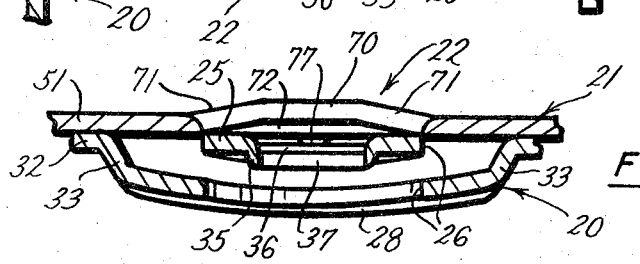
FIG. 4 is a view in section taken generally along the line 4—4 of FIG. 2.

It will be noted that the front edge of the spanning member 56 forms with the wall 51 a front opening 61, and the rear edge of the spanning member 56 forms with the wall 51 a rear opening 63, the openings 61 and 63 being at opposite ends of the groove 59. As best shown in FIG. 2, the spanning member 56 slopes upwardly from approximately midway between its front and rear to the rear opening 63, so that the front opening 61 is greater in the vertical dimension than the rear opening 63. The slope in the spanning member 56 makes it easier to insert the tongue 25, while ensuring that the tongue is firmly locked in place once inserted.

The portion of the wall 51 adjacent the rear edge of the spanning member 56 is raised to form a tongue-receiving portion 70 having outwardly sloping side walls 71 and outwardly sloping rear wall 72 which join with the wall 51 of the member 21. Hence, the front edge of the receiving portion 70 is spaced above the surface of the wall 51. This prevents the leading end of the tongue 25 from hitting the edge of the portion 70 when inserted into the groove 59. The rearwardly sloping wall 72 directs the leading end of the tongue 25 downwardly for secure locking of the tongue as will be described. This forcing of the leading end of the tongue 25 downwardly is important and is further accomplished by use of a protrusion 77 extending downwardly from the wall 51 and spaced slightly to the rear of the receiving portion 70.

Operation

To join the members 20 and 21 with the fastening means of this invention, the tongue 25 is inserted into the groove 59. As the leading end of the tongue 25 moves through the front opening 61 of the groove 59, the sloping portion of the spanning member 56 forces the tongue upwardly so that the top surface of the rear portion of the tongue and the top surface 32 of the member 20 fit flush against the bottom surface of the wall 51. As the tongue 25 moves through the groove 59, the leading end of the tongue is finally directed downwardly by the rearwardly sloping wall 72 of the tongue-receiving portion 70 and further downward by the protrusion 77.

The rearwardly sloping leading surface 36 of the protrusion 35 allows the tongue to move smoothly over the upper surface of the spanning member 56. When the trailing edge 37 of the protrusion 35 passes the rear edge of the spanning member 56, the tongue 25 snaps downwardly in place with the trailing edge of the protrusion 35 engaging the rear edge of the spanning member 56. Because the tongue is held downwardly by the protrusion 77, it is firmly locked in place and cannot be withdrawn. The result is an extremely rigid joint that firmly and permanently locks the members 20 and 21 together.

Preferably, the tongue 25 is slightly tapered to become narrower toward its leading end, and the groove 59 is likewise tapered, to allow the tongue to slide more easily into the groove and also to give a tighter lock. The widths of the tongue and groove should be such that the tongue fits tightly in the groove when locked in place. Also, the location of the tongue and groove relative to the ends of the members 20 and 21 are preferably such that, with the tongue locked in place within the groove, the end of the member 20 abuts the end wall of the member 21 for further structural rigidity.

Hence, there has been described a novel means for fastening members together which means is self-locking, easy to use and inexpensive to make, greatly reduces the time of assembly, provides an exceptionally strong and rigid joint, and otherwise fulfills the objects heretofore described.

Various changes and modifications may be made within this invention as will be readily apparent to those skilled in the art. Such changes and modifications are within the scope and teaching of this invention as defined by the claims appended hereto.

What is claimed is:

1. A fastener for joining members together, said fastener comprising a tongue means formed in a first member to be joined, said tongue means having a first protrusion extending from one of its sides, a groove means formed in a second member to be joined, said groove means having a spanning member which extends at least part way over the side of the tongue means from which the protrusion extends with the tongue means inserted into the groove means, and a second protrusion operatively positioned relative to said tongue and groove means so as to urge the tongue means against the spanning means with the tongue means fully inserted into said groove means.

2. The fastener of claim 1 wherein the second protrusion is formed in said second member.

3. The fastener of claim 1 wherein the members to be joined are formed of sheet material and said tongue and groove means are formed integrally therewith.

4. The fastener of claim 1 wherein the groove means further comprises a front opening formed at the front edge of the spanning member and a rear opening formed at the rear edge of the spanning member, said tongue means extending through both of said openings, said front opening being larger in the vertical dimension than said rear opening for ease in starting the tongue means through the groove means and to provide a tight fit between the tongue means and the groove means at the rear opening.

5. The fastener of claim 1 comprising a tongue-receiving means above the rear of the groove means to receive the end of the tongue means as it passes therethrough and direct it against the spanning member.

6. The fastener of claim 1 wherein the tongue means narrows toward its end, and the groove means narrows from front to rear for ease in joining the members and for a tight fit.

7. The fastener of claim 1 wherein the leading surface of the tongue protrusion slopes from its base to its end away from the end of the tongue means for ease in passing the tongue means over the spanning member as the members are joined together, and wherein the trailing surface of the tongue protrusion is formed to intercept the rear edge of the spanning member.

8. A fastener for joining members together, said fastener comprising a tongue means formed in a first member to be joined, said tongue means having a protrusion extending from one of its sides, a groove means formed in a second member to be joined, said groove means having a spanning member which extends at least part way over the side of the tongue means from which the protrusion extends with the tongue means inserted into the groove means, the groove means further having a front opening formed at the front edge of the spanning member and a rear opening formed at the rear edge of the spanning member, said tongue means extending through both of said openings, said front opening being larger in the vertical dimension than said rear opening for ease in starting the tongue means through the groove means and to provide a tight fit between the tongue means and the groove means at the rear opening, and means urging said protrusion into locking engagement with said spanning member with said tongue means fully inserted into said groove means.

9. A fastener for joining members together, said fastener comprising a tongue means formed in a first member to be joined, said tongue means having a protrusion extending from one of its sides, a groove means formed in a second member to be joined, said groove means having a spanning member which extends at least part way over the side of the tongue means from which the protrusion extends with the tongue means inserted into the groove means, and a tongue-receiving means above the rear of the groove means to receive the end of the tongue means as it passes therethrough and direct it toward the spanning member.

* * * * *